Patented Jan. 1, 1952

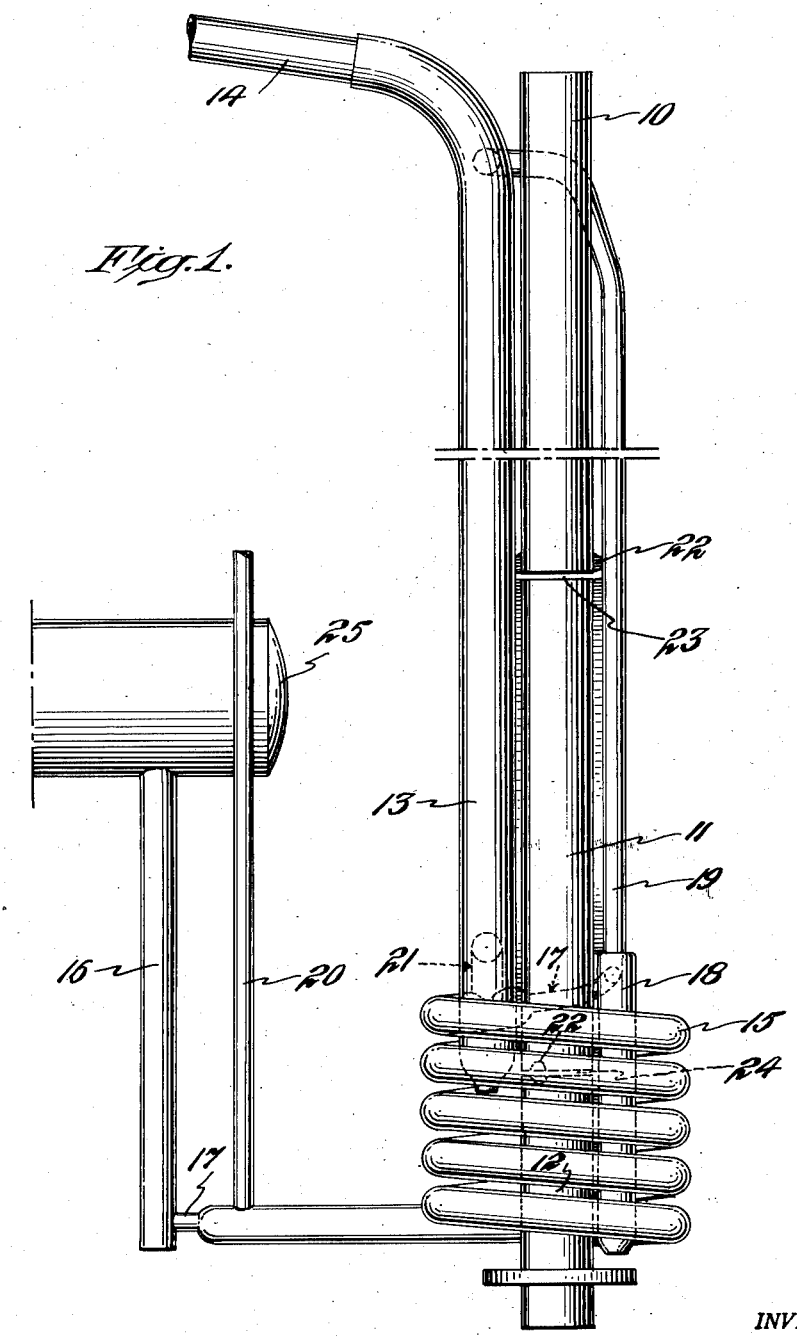

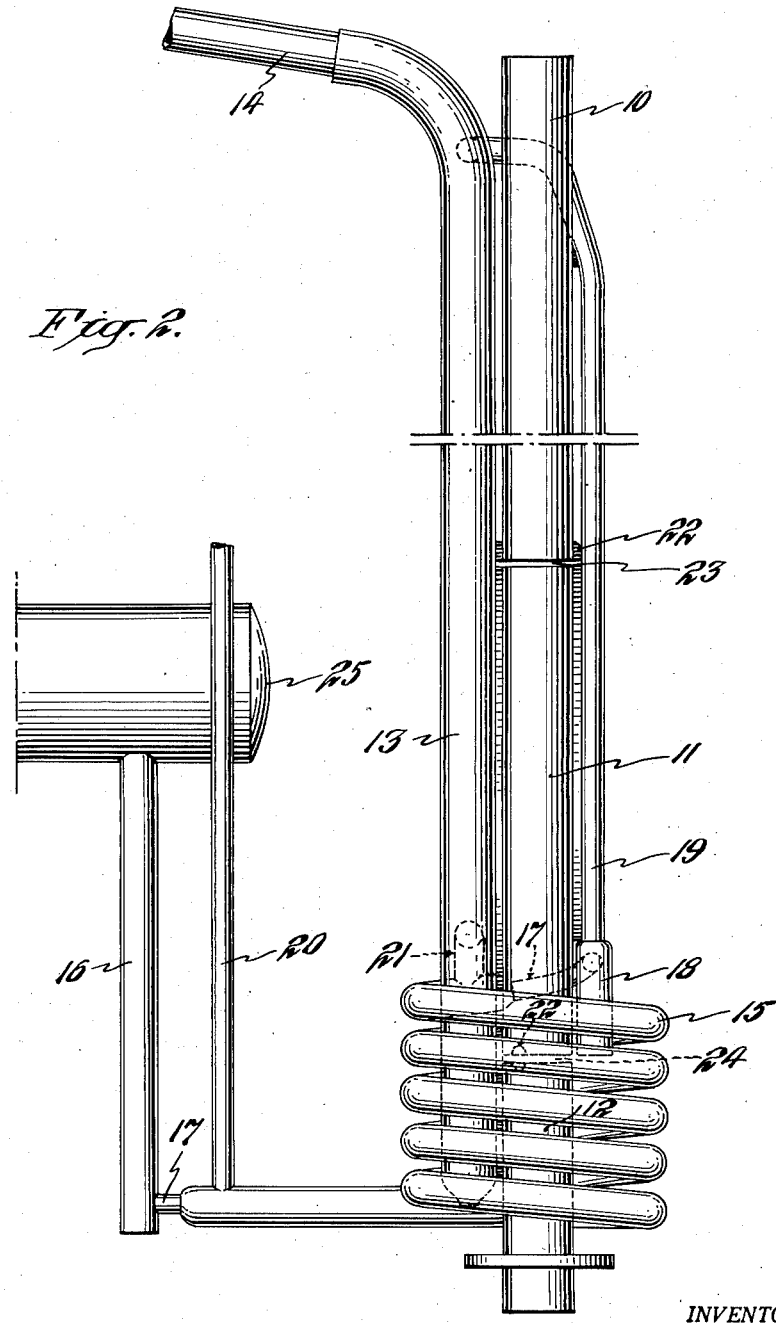

2,580,442

UNITED STATES PATENT OFFICE 2,580,442

ABSORPTION REFRIGERATION SYSTEM

Wilhelm Georg Kögel, Stockholm, Sweden, assignor to Aktiebolaget Elektrolux, Stockholm, Sweden, a corporation of Sweden Application May 16, 1946, Serial No. 670,145
In Sweden June 13, 1945

20 Claims. (Cl. 62—119.5)

This invention relates to absorption refrigerating systems of the type having a vapor expulsion unit in which a source of heat is arranged to expel refrigerant vapors in a conduit which is thermally insulated and through which absorption solution is adapted to flow, such conduit being arranged in heat conductive relation with a heating tube or flue enveloping the heat source. It is an object of the invention to provide an improvement in absorption refrigerating systems of the above type whereby the heat emitting region of a source of heat can be disposed at different positions in the tube or flue depending upon the particular type of heat source employed, thereby making it possible to operate the same refrigerating system in a satisfactory manner, for example, either by an electrical heating element or a gas or liquid fuel burner whose flame is adapted to project into the lower end of the heating flue.

It is already known to construct the vapor expulsion units of absorption refrigerating systems for electrical operation in such manner that the heat emitting region or active part of the electrical heating element or cartridge may be positioned in the middle part of the heating flue, whereby the so-called edge-losses, that is, radiation losses from the lowest part of the flue, are substantially eliminated. However, it has always been desirable to utilize such systems particularly adapted for electrical operation for operation also with liquid and gas fuel burners.

In accord with my invention I provide a solution to this problem while retaining the advantageous features of the vapor expulsion unit. I accomplish this by providing a vapor expulsion unit having a conduit in which one part heat conductively connected to a first section of a heating flue forms an active portion of the absorption solution circuit and to which solution is conducted and from which solution leaves at an inlet and outlet, respectively, and in which another part of the conduit containing absorption solution is outside or beyond the active portion thereof and heat conductively connected to a section of the heating flue thermally segregated from the first section of the heating flue.

The invention, together with the above and other objects and advantages thereof, will be better understood from the following description taken in connection with the accompanying drawing forming a part of this specification, and of which:

Fig. 1 illustrates more or less diagrammatically an absorption liquid circuit of an absorption refrigerating system including a vapor expulsion unit embodying the invention; and Fig. 2 is a view similar to Fig. 1 illustrating another embodiment of the invention.

The vapor expulsion unit shown in Fig. 1 includes a heating tube or a flue divided into three parts, the upper part being denoted by 10, the middle part by 11 and the lower part by 12, the three parts being thermally separated or segregated by gaps or spaces 23 and 24. Both parts 12 and 11 operate as heat transfer members while the upper part 10 essentially serves only as an outlet passage for combustion gases. Accordingly, the upper flue part 10 may be made of material which is thinner and possibly less heat conducting than the other parts which suitably may be formed of iron, for example. Along a common generatrix the middle part 11 of the flue is heat conductively connected by welding, or in any other suitable way, with a relatively thick conduit 13 which is closed at its lower end, such conduit constituting the boiler of the vapor expulsion unit and from which the expelled refrigerant vapors are conducted through a conduit 14 to the condenser of the system, not shown. Rich absorption solution is conducted to the vapor expulsion unit from an absorber vessel 25 through a conduit 16 and an inner conduit of the liquid heat exchanger 15. The heat exchanger 15 is in the form of a coil concentrically disposed about the flue. The inner pipe 17 of the heat exchanger is connected to the upper part of a vessel 18 formed of piping, the lower end of which is closed and the upper end of which is connected to a conduit 19 which, together with the vessel 18, forms a liquid circulating pump for raising or lifting solution by vapor lift or thermosiphon action. The conduit 19 communicates with the upper part of the boiler 13 into which the raised solution is is delivered to form the liquid column from which absorption solution passes through a conduit 21, the outer passage of the heat exchanger 15 and a conduit 20 to an absorber, not shown. The refrigerating system is adapted to operate with hydrogen gas, ammonia and water as working media.

The pump conduit 19 is heat conductively connected to the flue part 11 along a common generatrix, as by welding, for example. The absorption solution rich in ammonia, due to heating effected by the flue part 11, is lifted by vapor lift action through conduit 19 into the boiler 13. The solution flowing downwardly in the conduit 13, due to the heat conductive connection thereof with the flue part 11, gradually becomes weaker in ammonia and thence passes through the conduit 21 to the absorber. In electrical operation the electric heating cartridge is placed at a level with the flue part 11, preferably in such a manner that the active part or heat emitting region thereof terminates a few centimeters above the lower opening of the flue part 11. The heat conductive connection between the boiler 13 and the flue part 11, and also that between the pump pipe or conduit 19 and such flue part, also may be terminated a few centimeters above the lower opening of the flue part 11. The lower part of the electrical heating element or cartridge, which extends downwardly through the flue part 12, preferably does not contain any resistance winding and consists of a body of steatite having the smallest possible mass and consequently the smallest possible power for conducting heat.

In electrical operation the entire quantity of heat required for operating the refrigerating system is supplied by the upper two thirds or three fourths portions of the flue part 11. Due to the thermal segregation of the flue part 11 from the flue part 10 at the gap 23 and from the lower flue part 12, uninhibited flow of heat from the middle flue part 11 to the flue parts 10 and 12 is prevented. The three flue parts are held together by welds 22, or in any other suitable way. Between the several flue parts the air spaces 23 and 24 are provided, particularly in instances where two adjacent flue parts are formed of metal.

In gas and liquid fuel operation the burner flame cannot in practical use be positioned within the middle flue part 11 but must be arranged nearer to the lower opening of the heating tube or flue, that is, in the lower flue part 12. The escaping combustion gases are, at least in refrigerating systems of small size, sufficiently warm to cause expulsion of refrigerant from solution in the boiler 13. On the other hand, the heat supply to the conduit 19 will in many cases be insufficient. In order to ensure satisfactory pumping and raising of liquid into the upper part of boiler 13, the vessel 18, which forms a pocket-like reservoir for absorption solution, is heat conductively connected to the flue part 12 along a common generatrix. The heat conductive connection between the upper part of the vessel 18 and the flue part 11 is preferably interrupted, so that undesirable heat transfer from the latter to the vessel in electrical operation is avoided. The vapor expulsion which takes place in the vessel 18, due to the heat conductive connection thereof with the flue part 12, will be entirely sufficient to effect satisfactory pumping and raising of liquid in the conduit or vapor lift tube 19. Due to the non-uniform manner in which heat is supplied to the vessel 18, a sufficient renewal of solution takes place in the vessel although the latter is not provided with an outlet connection and hence is located outside the active portion of the path of liquid flow in the absorption solution circuit which includes the pump conduit 19 and also the boiler 13.

The embodiment in Fig. 2 differs from that shown in Fig. 1 in that heat from the lower flue part 12 is not supplied to the pump 19 or vessel 18 but instead is supplied to the boiler 13 which is extended downwardly reckoned from the outlet conduit 21 and is heat conductively connected to the flue part 12 along a common generatrix. In this embodiment the vessel 18 only extends down to the lower opening of the middle flue part 11 and serves essentially as a collecting pocket for solid particles possibly flowing along with the absorption solution. Consequently, it may in many cases be entirely omitted. The embodiment of Fig. 2, in which the reference numerals correspond to those used in Fig. 1, is especially intended for refrigerating systems of small size having a relatively small pump height compared to the reaction head or column for the pump. In such systems operated by a gas or liquid fuel burner, the quantity of heat taken up from the combustion gases by the pump conduit 19 is sufficient to effect the relatively small pumping action which is necessary. On the other hand, the quantity of vapor expelled may be insufficient in such small size refrigerating systems, whereby the concentration of refrigerant in solution passing from the boiler 13 may not be adequately weak to effect satisfactory absorption in the absorber. The likelihood of such an operating condition is avoided by providing the downwardly extending section of boiler 13 which projects below the conduit connection 21. In order to prevent an undesired heat transfer from the flue part 11 in electrical operation, similar to that described above in connection with the embodiment in Fig. 1, the welded connection between the boiler 13 and the flue tube and also that between the latter and the pump is terminated along the lowest part of the flue part 11.

The invention is not to be limited to the embodiments diagrammatically shown but may be varied without departing from the spirit and scope of the invention. It may finally be mentioned that the vapor expulsion unit, including the heat exchanger 15, desirably is enclosed in a well known manner in a shell or casing having openings through which the upper and lower ends of the heating tube or flue project and which is filled with heat insulating material.

I claim:

1. In an absorption refrigeration system, a heating flue including at least two sections having poor heat conducting paths therebetween and of which either a first section or a second section is adapted to be utilized as the highest temperature heat input region of said flue, an absorption solution circuit comprising a vapor expulsion unit including piping in heat transfer relation with said first flue section, said piping forming a portion of said circuit traversed by absorption solution, and means to hold solution which is in communication with said piping, said solution holding means being in heat transfer relation with said second flue section and outside said circuit portion traversed by solution.

2. In an absorption refrigeration system, a heating flue including several sections having poor heat conducting paths therebetween and of which either a first section or a second section is adapted to be utilized as the highest temperature heat input region of said flue, an absorption solution circuit comprising interconnected parts including several conduits constituting a boiler pipe and a riser pipe, respectively, said riser pipe being arranged to raise solution by vapor lift action by heat derived from said flue to effect circulation of the solution, one of said conduits being thermally connected to said first flue section, said one conduit forming a portion of said circuit traversed by absorption solution, and said one conduit having a part communicating with said circuit which is thermally connected to said second flue section and outside said circuit portion traversed by solution.

3. In an absorption refrigeration system, a heating tube or flue whose inner surface is adapted to be heated by a source of heat, an absorption solution circuit comprising a vapor expulsion unit including a conduit section forming a circuit portion traversed by absorption solution which is thermally connected to a first region of said flue, and said conduit section having a lower located part communicating with said circuit which is thermally connected to a second region of said flue and outside said circuit portion traversed by the solution, said flue having a poor heat conducting path between said second region and other regions thereof including said first region.

4. In an absorption refrigeration system, a heating tube or flue whose inner surface is adapted to be heated by a source of heat, an absorption solution circuit comprising a portion traversed by solution which includes a conduit thermally connected to a first region of said flue, and said conduit having a dead-end part communicating with said circuit which is thermally connected to a second region of said flue and outside said circuit portion traversed by the solution, said first and second flue regions having a poor heat conducting path therebetween.

5. In an absorption refrigeration system, a heating flue comprising a plurality of sections including a lower section and a higher section having a poor heat conducting path therebetween, either said lower or upper section being adapted to be utilized as the highest temperature heat input section of said flue, a circuit for circulating absorption solution including a vapor expulsion unit having piping providing a liquid flow path which is thermally connected to said higher flue section, a conduit connected to said piping which communicates with said flow path at a lower region thereof, said conduit being connected to said piping so that a bottom end thereof below said region forms a liquid pocket, and said pocket being thermally connected to said lower flue section.

6. Apparatus as set forth in claim 5 in which the extreme lower end of said higher flue section is adjacent the extreme upper end of said lower flue section, and said piping is thermally connected to said higher flue section at a region removed from the extreme lower end portion thereof.

7. Apparatus as set forth in claim 5 in which said piping is connected in said circuit to provide a liquid flow path through which solution passes upwardly therein.

8. Apparatus as set forth in claim 5 in which said piping is connected in said circuit to provide a liquid flow path through which solution passes downwardly therein.

9. In an absorption refrigeration system, a heating flue comprising a plurality of sections including a lower section and a higher section having a poor heat conducting path therebetween, either said lower or upper section being adapted to be utilized as the highest temperature heat input section of said flue, a circuit for circulating absorption solution including a vapor expulsion unit having a riser pipe thermally connected to said higher flue section for raising solution by vapor lift action, a connection for conducting solution to said riser pipe, said connection communicating with said pipe so that the lower part thereof forms a liquid pocket below the region solution enters said pipe, and said pocket being thermally connected to said lower flue section and extending downwardly from the upper end thereof.

10. In an absorption refrigeration system, a heating flue comprising a plurality of sections including a lower section and a higher section having a poor heat conducting path therebetween, either said lower or upper section being adapted to be utilized as the highest temperature heat input section of said flue, a circuit for circulating absorption solution including a vapor expulsion unit having a conduit connected in said circuit to receive solution at the upper part thereof, a connection for conducting downwardly flowing solution from said conduit, said connection communicating with said conduit so that the lower part thereof forms a liquid pocket below the region solution leaves said conduit, and said pocket being thermally connected to said lower flue section and extending downwardly from the upper end thereof.

11. In an absorption refrigeration system, a heating flue including an upper, intermediate and lower sections having poor heat conducting paths therebetween and of which either the lower or intermediate section is adapted to be utilized as the highest temperature heat input section of said flue, an absorption solution circuit for circulation of solution comprising a vapor expulsion unit including a conduit section traversed by solution which is thermally connected to said intermediate flue section, and said conduit section having a portion which is outside said conduit section traversed by solution and thermally connected to said lower flue section, said conduit and upper flue section having a poor heat conducting path therebetween.

12. In an absorption refrigeration system, an upright heating flue, a circuit for circulation of absorption solution including a vapor expulsion unit having a plurality of upright conduits which are thermally connected to heat transfer regions of said flue at the exterior thereof and adapted to receive heat from a source of heat within said flue, said conduits being in overlapping relation in a vertical direction, one of said conduits serving as a boiler for holding a body of solution in which a major portion of the vapor expulsion is effected in said unit and another of said conduits serving as a pump pipe for raising liquid therethrough by vapor-liquid lift action, and said one conduit having a poor heat conducting path therefrom to said heating flue in a vertical direction extending upwardly from the heat transfer regions of said flue with which said one and other conduit are thermally connected.

13. In an absorption refrigeration system, a heating flue comprising a number of vertically disposed sections including an upper section, the lower peripheral edge of the upper section and the adjacent peripheral edge of the rest of the flue having a gap therebetween to maintain the upper flue section in poor heat conducting relation with the rest of the flue, and a circuit for circulation of absorption solution including a conduit which is thermally connected to said flue and adapted to receive heat from a source of heat within said flue, the thermal connection of said conduit to said flue being so constructed and formed that the upper portion of said flue is in poor heat conducting relation to said conduit as well as to the rest of said flue.

14. Apparatus as set forth in claim 13 in which the wall of said upper flue portion is thinner than that of the rest of said flue.

15. In an absorption refrigeration system of the inert gas type, an upright heating tube or flue whose inner surface is adapted to be heated by a source of heat, a circuit for circulating absorption solution which comprises a vapor expulsion unit including an upright conduit having an inlet and outlet at different levels for such solution which is in heat transfer relation with a region of said flue, said upright conduit through which flow of solution is effected from the inlet to the outlet thereof forming an active portion of said absorption solution circuit in which solution normally flows during operation of the refrigeration system, and said upright conduit also having a part in which such normal flow of solution is absent and which is disposed outside the active portion of said circuit and is in heat transfer relation with one region of said flue in poor heat conducting relation with other regions thereof including the region in heat transfer relation with the active conduit portion of said circuit, said one region of the flue being located nearer to the lower end of the flue than the region thereof in heat transfer relation with the active conduit portion of said circuit.

16. Apparatus as set forth in claim 15 in which the part of said conduit outside the active portion thereof between said inlet and outlet is closed at its lower end and forms a dead-end pocket for solution which is heat conductively connected to said one region of the flue along a common generatrix.

17. Apparatus as set forth in claim 15 in which said conduit constitutes a riser pipe for raising solution by vapor lift action, and the part of said conduit which is in heat transfer relation with said one region of the flue is in open communication with such riser pipe at a region solution flows therethrough.

18. Apparatus as set forth in claim 15 in which part of said conduit which is in heat transfer relation with said region of the flue extends downwardly from and constitutes an extension of the conduit portion between the inlet and outlet, said outlet being below said inlet and serving as a place through which absorption solution weak in refrigerant passes from said conduit.

19. Apparatus as set forth in claim 15 in which the flue comprises first and second sections adjacent to one another and having a poor thermal gap therebetween, the active portion of said conduit for flowing solution therethrough being heat conductively connected to the first section of said flue and said part being heat conductively connected to the second adjacent section of the flue, the surface portion of the first flue section which is heat conductively connected to the active portion of said conduit being spaced and removed from the gap between the first and second flue sections.

20. In an absorption refrigeration system, a heating flue including an upper portion whose lower end is in poor heat conducting relation with the rest of the flue, the extreme lower end of the upper portion of the flue and the extreme upper end of the rest of the flue being adjacent to and spaced from one another to provide a gap therebetween, and a circuit for circulation of absorption solution including a conduit which is thermally connected to said flue and adapted to receive heat from a source of heat within said flue, the thermal connection of said conduit to said flue being such that said conduit is adapted to receive heat primarily from a region of said flue other than said upper portion and such upper flue portion is in poor heat conducting relation with said conduit as well as with the rest of said flue.

WILHELM GEORG KÖGEL.

REFERENCES CITED

The following references are of record in the file of this patent:

UNITED STATES PATENTS

| Number | Name | Date |
|---|---|---|
| 1,729,355 | Munters | Sept. 24, 1929 |
| 2,212,111 | Blomquist | Aug. 20, 1940 |
| 2,363,771 | Bergholm | Nov. 28, 1944 |
| 2,402,414 | Kogel | June 18, 1946 |